United States Patent [19]

Okano et al.

[11] Patent Number: 4,531,039
[45] Date of Patent: Jul. 23, 1985

[54] AUTOMATIC VALVE SEAT BUILD-UP WELDING APPARATUS

[75] Inventors: Masami Okano, Kita-kyushu; Akimasa Tanaka, Fukushima; Takeshi Suzuki, Kita-kyushu; Akira Ishida, Fukuoka; Tatsuo Miyazaki, Kita-kyushu, all of Japan

[73] Assignee: Okano Valve Seizo Kabushiki Kaisha, Kita-kyushu, Japan

[21] Appl. No.: 451,963

[22] Filed: Dec. 21, 1982

[30] Foreign Application Priority Data

Dec. 26, 1981 [JP] Japan .............................. 56-214896

[51] Int. Cl.³ .............................................. B23K 9/225
[52] U.S. Cl. ................................ 219/60 R; 219/76.14; 219/125.1; 219/123; 219/137.41
[58] Field of Search ............. 219/60 R, 125.1, 125.11, 219/123, 137.41, 124.34, 76.14

[56] References Cited

U.S. PATENT DOCUMENTS

3,009,049 11/1961 Stanley .............................. 219/60 R
3,254,192 5/1966 Braucht ........................ 219/137.41
3,825,712 7/1974 Gibbs ................................... 219/123
4,144,992 3/1979 Omae et al. ..................... 219/125.11

Primary Examiner—C. C. Shaw
Attorney, Agent, or Firm—LeBlanc, Nolan, Shur & Nies

[57] ABSTRACT

An automatic valve seat build-up welding apparatus for a Y-type main steam isolation globe valve used in an atomic power station is disclosed which is characterized in that the valve seat can be build-up welded on the spot by the welding torch introduced into the valve box with the welding operation being carried out remotely from the spot and viewed by an image sensor positioned near the welding torch so that the exposure of an operator to a radioactive environment is prevented.

10 Claims, 7 Drawing Figures

AUTOMATIC VALVE SEAT BUILD-UP WELDING APPARATUS

BACKGROUND OF THE INVENTION

The present invention relates to an automatic valve seat build-up welding apparatus and more particularly to an automatic valve seat build-up welding apparatus for a Y-type main steam isolation globe valve used in an atomic power station which allows the build-up welding operation of the valve seat as required for its repair, with the valve remaining mounted on the piping in the plant.

In general, in the maintenance of the valve seat of a Y-type globe valve referred to above there are two kinds, i.e. one periodical maintenance work carried out by a simple fitting operation of the valve seat, the other a rewelding operation carried out by a welding build-up of metal on the valve seat to compensate for its wear through time.

The present invention concerns an apparatus particularly suitable for use in the latter operation wherein considering the radioactive environment of the piping areas where the valves are mounted, the maintenance work accompanying the build-up welding operation can be carried out remotely.

In the yearly routine inspection of the valve opening at an atomic power plant, the fitting of the valve seat is an indispensable operation. In particular, in main stream valves which are subjected to repeated checks yearly, their valve seats are gradually worn by the wear due to the fitting operations as well as from the usual operation of the plant.

On the other hand, for preventing wear in valve seats of valves of this kind, they are originally built-up by welding using materials having a high wear resistance such as stelite, etc., but, since the thickness of such a built-up welded layer has a definit limit, once this layer has been lost due to wear, it is apparent that there will be a loss of sealing properties between the valve disc and the valve seat, generating a functional impediment, and exerting a negative influence on the operation of the power plant.

In order to obviate these difficulties it is necessary to regain valve function by either replacing the valve with a new one or repairing it on the spot. Further, another cause for repair of the main valves, may also be that a defect in the build-up welded portion may occur during the operation due to some metallurgical reason. Among the means for regaining the function of the valve as mentioned above, the replacement of the valve requires not only large scale work, but also the power plant is as a whole, significantly influenced. Therefore, on the spot repair means have been generally adopted. However, hitherto, in the maintenance of general piping starting from edge preparation of the welded portions, followed by the build-up welding, the final finishing operation, etc. all have had to be carried out manually by a plurality of workers, i.e. by so-called human wave tactics.

When the surroundings in which the maintenance operation is to take place are considered, since it must be carried out within a radioactive environment, a single workman is limited in his operation time due to radiation exposure, causing an increase in the number of workmen necessary for the maintenance work, considerably increasing personnel expenses. Further, an unnecessarily large amount of radiation exposure in a workman is not desirable in view of health concerns, so it is desirable that the amount of exposure be limited as much as possible.

From the foregoing, it is desirable that in an atomic power plant a series of the operations required for the maintenance of the pipings, in particular valves be remotely and automatically carried out.

SUMMARY OF THE INVENTION

It is an object of the present invention to provide an automatic build-up welding apparatus for the valve seat of a main valve used in an atomic power plant, in particular a Y-type main steam isolation globe valve.

It is another object of the present invention to provide an automatic build-up welding apparatus for a Y-type main steam isolation globe valve which makes it possible to build-up weld the valve seat on the spot by control remote thereof.

In accordance with the present invention an automatic build-up welding apparatus for the valve seats of Y-type main steam isolation globe valves is provided which comprises four mechanisms, i.e. a welding unit, a main drive, an observation and a slip ring mechanism adapted to be either removably connected together in series or integrally assembled, whereby the welding unit mechanism is adapted to be introduced from the outside into the valve box of the valve to carry out the build-up welding operation, the welding unit mechanism having a main drive shaft rotatively mounted therein so that it protrudes outwardly from the valve box coaxially thereto when the welding unit mechanism is fixedly mounted thereto in position, the main drive shaft fixedly mounting at its forward end an image sensor and a welding torch for a TIG welding process for the build-up welding at an angle to the center line of the main drive shaft so as to be movable in parallel as well as at right angles thereto, the welding head mechanism being further provided, at its forward end near the welding torch, with the supply tip for the build-up welding wire; the main drive mechanism being adapted to be fixedly secured to the outside of the valve box and also adapted to be removably or integrally connected to the welding unit mechanism, whereby the main drive mechanism is provided within, various electric motors and transmitting elements operatively associated therewith as the drive sources for the swinging of the main drive shaft of the welding unit mechanism as well as the shifts of the welding torch mounted therein in the direction of the center line of the main drive shaft and at right angles thereto; the observation mechanism being adapted to be removably or integrally connected to the main drive mechanism and containing therein television camera to be electrically connected to the image sensor mounted in the welding unit mechanism and also provided with a welding wire feed device to supply wire to the build-up welding wire supply tip mounted on the welding unit mechanism, and finally the slip ring mechanism being adapted to be removably or integrally connected to the observation mechanism and provided with various slip rings so as to be rotated at the same speed as that of the main drive shaft of the welding unit mechanism and adapted to receive the electric signals issued from the television camera contained within the observation mechanism and to supply electric power to the various motors contained in the main drive mechanism, and additionally containing a supply of shielding gas for the TIG welding process as well as cooling water circulation devices for the image sensor and the welding torch mounted in the welding unit mechanism.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENTS

Figure 1:
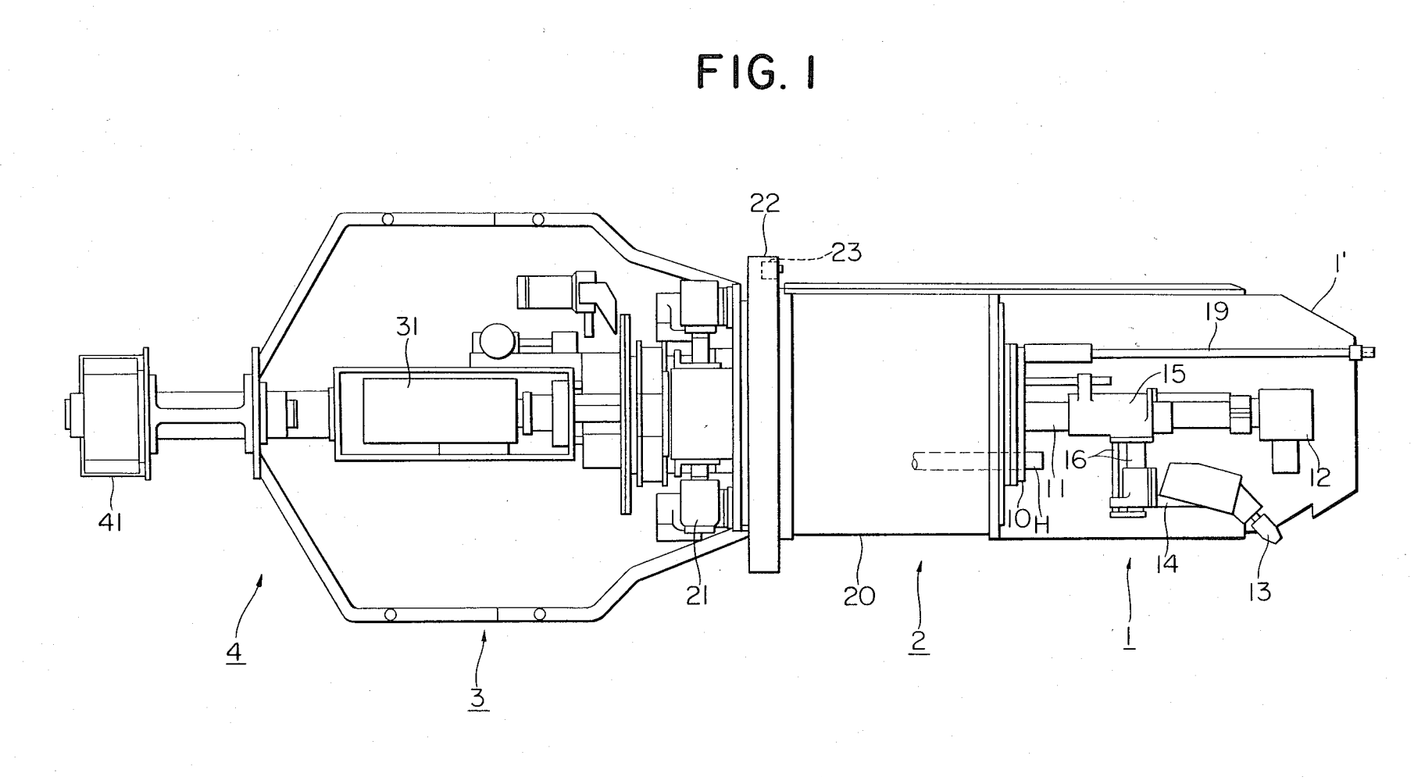
FIG. 1 is a front elevational view of one embodiment of the present invention.
Figure 2:
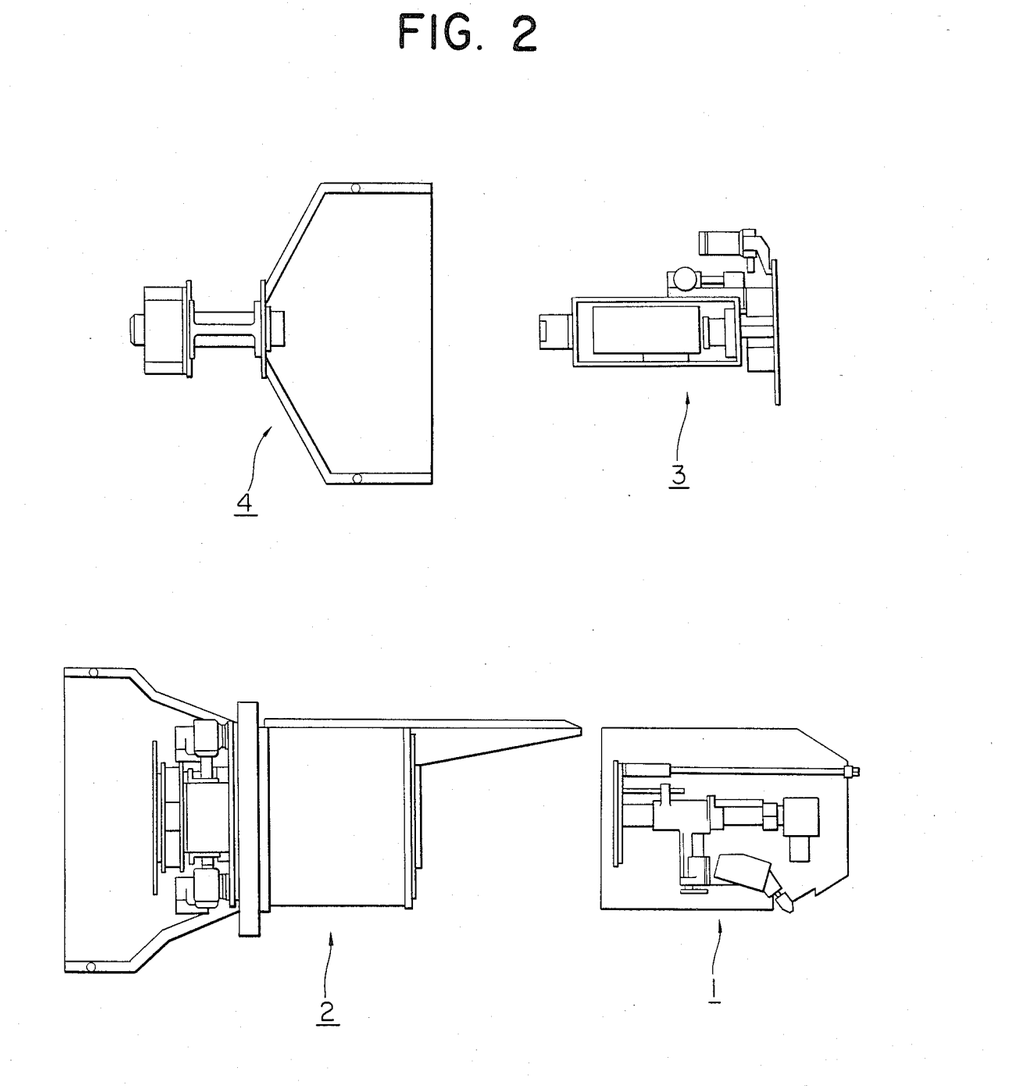
FIG. 2 is an exploded view of the apparatus shown in FIG. 1.

Referring now to FIG. 1 of the attached drawings showing the general arrangement of one of the embodiments of the present invention in a schematical side elevational view, the present apparatus comprises four mechanisms, i.e. a welding unit, a main drive, an observation and a slip ring mechanism 1, 2, 3 and, 4, respectively, arranged in this order in alignment with each other such that the adjoining mechanisms e.g. welding unit and main drive mechanisms 1 and 2 are removably connected together by any suitable means. FIG. 2 shows the respective mechanisms in their removed states in a somewhat diagrammatical view. Following are the detailed explanations of the respective mechanisms.

1. Welding Unit Mechanism

As shown in FIGS. 1 and 2, welding unit mechanism 1 which constitutes the forward end element of the apparatus comprises a circular-disc shaped base 10 through which passes centrally thereof a hollow main shaft 11 longitudinally and rotatable about its longitudinal axis. Fixedly secured to the forward end of main shaft 11 is an image sensor 12 such that its view axis is directed at right angles to the longitudinal axis of main shaft 11. Further, main shaft 11 carries a welding torch 13 for a TIG arc welding process for carrying out build-up welding, at an appropriate distance apart from image sensor 12 such that the center line of welding torch 13 crosses obliquely with the view axis of image sensor 12, thus the center line of welding torch 13 being arranged also at an angle relative to the longitudinal axial line of main shaft 11 and also adapted to be shiftable along main shaft 11. For this end welding torch 13 is carried on a support frame 14 generally extending in parallel with the longitudinal axial line of main shaft 11, support frame 14 itself being shiftably mounted on guide bars 16 which are in turn mounted at right angles to a guide frame 15 that is adapted to be shiftable along main shaft 11. Thus, welding torch 13 is adapted to be independently shifted along the longitudinal axial line of main shaft 11 as well as at right angles thereto when guide frame 15 and support frame for the purpose of the shifts of guide frame 15 and support 14 are shifted in their respective directions independently. frame 14 they are adapted to have respectively transmitted suitable motions from main driving mechanism 2 through appropriate motion transmitting means not shown, respectively, the motion transmitting means being under a suitable control to be described later.

Further, main shaft 11 is adapted to be rotated about its longitudinal central axis by main driving mechanism 2 and its rotational speed is controllable. Therefore, when main hollow shaft 11 is rotated, welding torch 13 is also rotated along with guide frame 15 at the same speed as that of main shaft 11, and image sensor 12 rigidly connected to main shaft 11, is also rotated together with and at the same speed as main shaft 11.

Figure 3:
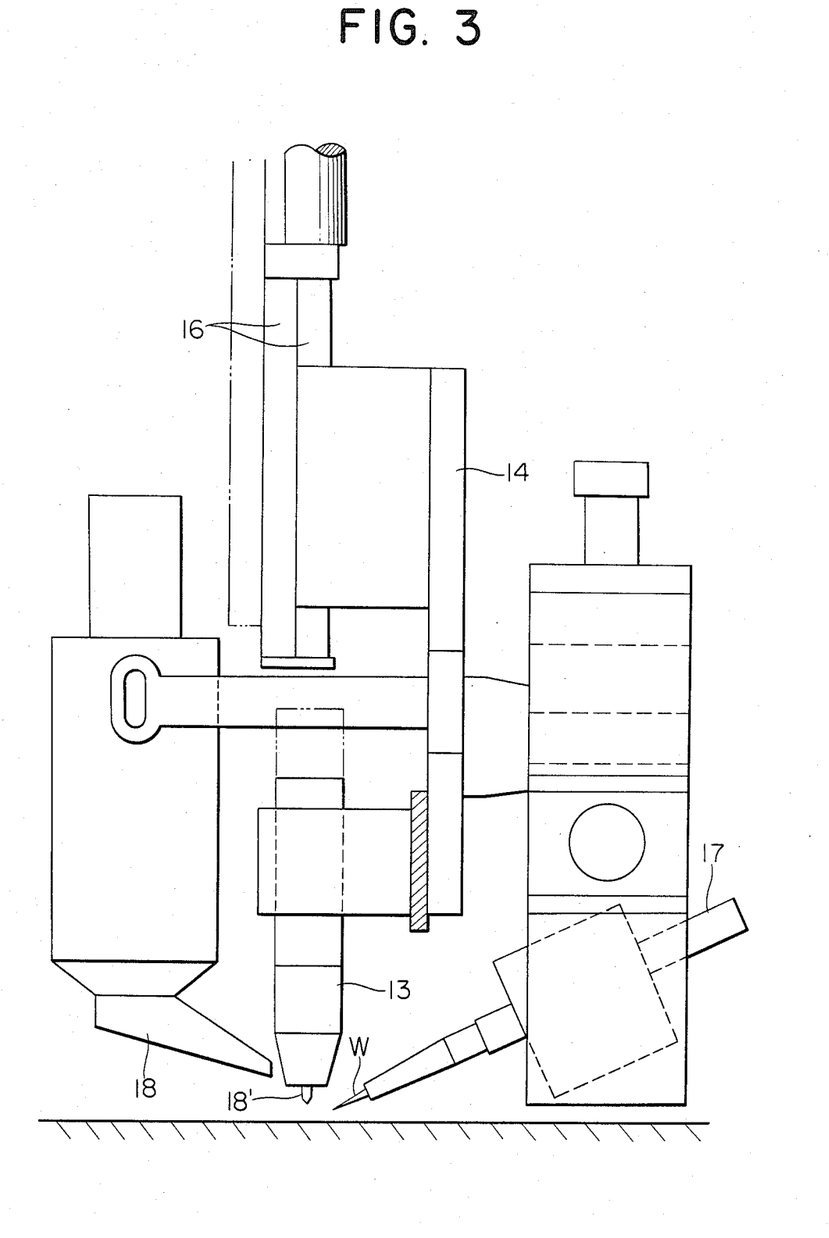
FIG. 3 is a view of the welding part of the welding unit mechanism shown in FIG. 1 on a larger scale.

At this point, welding torch 13 for the TIG welding process will be somewhat more precisely explained in reference to FIG. 3.

As shown in FIG. 3, a tungsten electrode 13' protrudes from the forward end of welding torch 13, whereby an inert gas such as an argon gas is discharged through torch 13 so as to surround the tungsten electrode 13' as a shield gas. Fixedly supported on support frame 14 is a tip 17 for supplying a build-up welding metal wire W in such a manner that metal wire W is supplied directly beneath the free end of electrode 13' with a small gap being left therebetween and yet so as to have their center lines intersecting obliquely. Thus, as well known in the art, when an electric arc is discharged between the free ends of tungsten electrode 13' and the build-up welding metal wire W under the discharge of the shield gas from welding torch 13 around electrode 13', metal wire W is melted due to the high temperature generated. In this case, as shown in FIG. 3, a weaving electrode 18 weaves the magnetic field generated by the arc, is also swingably mounted on support frame 14 so that its forward end is positioned near the forward end portion of welding torch 13, weaving electrode 18 receiving its driving force from the main driving mechanism 2 so that the forward end vibrates towards welding torch 13, whereby the frequency and the amplitude of the vibration are adjustable, thereby making the weaving properties also adjustable.

Additionally welding unit mechanism 1 is enclosed by a bottomed, cylindrical casing 1' which is removably connected at its bottom to the end of a fastening rod 19 by any suitable means and in which rod 19 is rigidly connected at its other end to fundamental base 10 so as to extend parallel with the longitudinal axial line of main shaft 11. The upper open end of casing 1' terminates substantially in alignment with the bottom surface of fundamental base 10 and has an opening near the bottom thereof that exposes the end of welding torch 13 outwards as well as not to obstruct the field of view of the image sensor 12.

Further, welding unit mechanism 1 is provided with a fume exhaust pipe H that opens near fundamental base 10 and which serves to discharge to the outside the various fumes generated during the welding operation of welding unit mechanism 1.

2. Main Drive Mechanism

Since welding unit mechanism 1 has its welding torch 13 always exposed to a high temperature atmosphere, say about 300° C., during operation it is impossible to mount the motors to drive image sensor 12 and welding torch 13, etc. within welding unit mechanism 1. In order to obviate this difficulty main drive mechanism 2 contains the prime motors for driving welding torch 13, etc. and functions to deliver necessary movements for the respective members of welding unit mechanism 1 from there through suitable transmitting means such as universal joints, flexible shafts, etc. That is, main drive mechanism 2 has a housing 20 of substantially a cylindrical shape, the one end of which is adapted to be connectable to welding unit mechanism 1 at the portion of base 10 thereof, remote from image sensor 12, and the other end of which mounts a motor 21 that is adapted to drive and rotate main shaft 11 of welding unit mechanism 1 through a suitable transmitting means. Main drive mechanism 2 contains additionally, several motors which operate respectively through suitable transmitting means to move guide frame 15 of welding torch 13 in the axial direction of main shaft 11, or to move support frame 14 at right angles to the axial direction of main shaft 11, to give weaving mechanism 18 an oscillating movement, etc. Fixedly secured to housing 20 at the end remote from welding unit mechanism 1, is a flange 22 within which are embedded in the side confronting the valve box one or more electromagnets 23, which are energized to enable securing main drive mechanism 2 to the valve box.

3. Observation Mechanism

In observation mechanism 3 adapted to be connected to housing 20 of main drive mechanism 2, is mounted a television camera 31 directly in communication with image sensor 12 located in welding unit mechanism 1 and the image of the portion being welded taken by image sensor 12 is sent to television camera 31 as electrical signals, the view transformed in camera 31 being further transmitted to a television receiver mounted on an external control board through electrical wires via slip ring mechanism 4. Further, in observation mechanism 3 there is also provided a welding wire supply device which is adapted to supply the build-up welding metal wire to tip 17 attached to welding torch 13, for the TIG welding process located in welding unit mechanism 1.

4. Slip Ring Mechanism

Finally, slip ring mechanism 4 adapted to be connectable to observation mechanism 3 at the end opposite to main drive mechanism 2, has various slip ring elements 41 which act to supply electric current to the respective motors contained in main drive mechanism 2 under control of the control board and which are adapted to be rotated in synchronization with the rotation of main shaft 11. Slip ring mechanism 4 also involves cooling water circulation systems for cooling image sensor 12, welding torch 13, etc. in welding unit mechanism 1 and further a supply device to deliver the shield gas to welding torch 13.

The operation of the apparatus in accordance with the present invention, the constitution of which has been described and illustrated above is as follows:

Although no special descriptions are given here it will be appreciated that on carrying out the repair operation of the valve seat by the use of the apparatus according to the present invention the following remotely controlled apparatuses are considered to be cooperatively used:

(1) Automatic Machining Apparatus;
(2) Heat Treatment Apparatus; and
(3) Automatic Penetrant Testing Apparatus.

Among these apparatuses the automatic machining apparatus is to be used for edge preparation of the portion of the valve seat to be build-up welded, prior to the operation of the apparatus according to the present invention and the finish machining after the completion of the welding operation by the present apparatus, the automatic machining apparatus being provided with an image sensor therein to be associated with an outside television receiver and adapted to be remotely controlled. The heat treatment apparatus is intended to heat the valve box from the outside in order to pre-heat the welding part and to heat treat the welded portion after the completion of the welding by the present apparatus. The automatic machining and heat treatment apparatuses are both adapted to be remotely controlled through the control board. Finally the automatic penetrant testing apparatus is to be used to check whether or not any defect exists at the welded portion and also whether or not the welding operation has been carried out satisfactorily.

Now the Y-type main steam isolation globe valve, at which the repair by the apparatus in accordance with the present invention is aimed, is generally positioned at the inner part of a narrow passage, making it difficult to transport a large apparatus, but since this embodiment of the present invention employs a constitution comprising four removable, separatable parts, after the apparatus has been transported to the site in four separate parts, welding unit mechanism 1 and main drive mechanism 2 of the present apparatus are assembled beforehand on the spot, and then introduced into the valve box, which has previously had the valve seat edge prepared by the automatic machining apparatus, such that image sensor 12 and welding torch 13 of welding unit mechanism 1 are directed forwards and flange 22 of main drive mechanism 2 is secured to the valve box by energizing electromagnets 23. Thereafter observation mechanism 3 and slip ring mechanism 4 are also assembled to constitute an assembly together with main drive 2 and welding unit mechanism 1, and the assembly is electrically connected to the control board. In this case, main shaft 11 and support frame 15 as well as support frame 14 of welding torch 13 in welding unit mechanism 1 are suitably connected to the various motors and the transmission means of main drive mechanism 2, the build-up welding wire supply device and the television camera 31 of observation mechanism 3 being suitably connected to the build-up welding wire supply tip 17 and the image sensor 12 of welding unit mechanism 1, and the various slip rings and the shield gas supply device of slip ring mechanism 4 are connected to the various motors of main drive mechanism 2 and welding torch 13 of welding unit mechanism 1, respectively. Further, the connection of image sensor 12 and welding torch 13 of welding unit mechanism 1 to the circulating cooling water system as well as to fume exhaust tube H is also ensured. After completion of the assembly of the apparatus in accordance with the present invention, electric currents are supplied to the various motors of main drive mechanism 2 through slip ring mechanism 4 from the external electric source via the control board, the shield gas being supplied to welding torch 13, and build-up welding wire W can be delivered to wire supply tip 17 for build-up welding from observation mechanism 3, and wire W can be thrust out directly below electrode 13' of welding torch 13.(see FIG. 3)

The vicinity of the forward end portion of welding torch 13 is illuminated together with the valve seat of the valve box to be repaired, by a lamp provided in image sensor 13 and a picture thereof can be taken by television camera 31 of observation mechanism 3, the picture being transmitted to the television receiver mounted in the control board.

Figure 4:
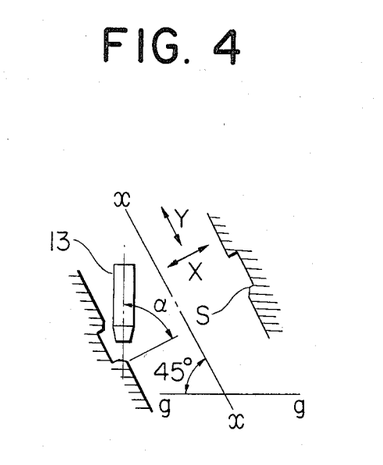
FIG. 4 is an explanatory view to show the relationship between the welding torch and the build-up welded portion.

In this case, in the Y-type main steam isolation globe valve to which is build-up welding is directed, the central axis x—x of its valve box is as shown in FIG. 4, constructionally inclined at an angle of 45° relative to the horizontal line g—g, valve seat S lying in a plane orthogonal to this center line x—x. Thus, the apparatus in accordance with the present invention is set such that its center line aligns with the center line x—x of the valve box. Therefore, also main spindle 11 is inclined at 45° relative to horizontal line g—g. For this reason, in order that welding torch 13 is positioned substantially at right angles to the surface of valve seat S, it is set at an angle relative to main shaft 11 so that the angle α made between it and the surface of valve seat S is 45°. Therefore, in order to build-up weld the whole periphery of valve seat S, welding torch 13 must be rotated as main shaft 11 rotates. At this time, as stated above, since welding torch 13 is mounted to main shaft 11 through guide frame 15 and support frame 14 and the frames themselves can be driven respectively by their own motors the position of welding torch 13 relative to valve seat S is adjustable.

Thus, when welding wire W protruding directly below electrode 13', comes into contact with valve seat S by the manipulation of guide frame 15 and support frame 14 the movement of welding torch 13 is halted (FIG. 5), then when the shield gas is discharged around electrode 13' of welding torch 13 and an electric current is supplied to electrode 13', and wire W is supplied, the build-up is begun. Simultaneously the rotation of main shaft 11 and the drive of guide and support frame 15, 14 are started.

Figure 5:
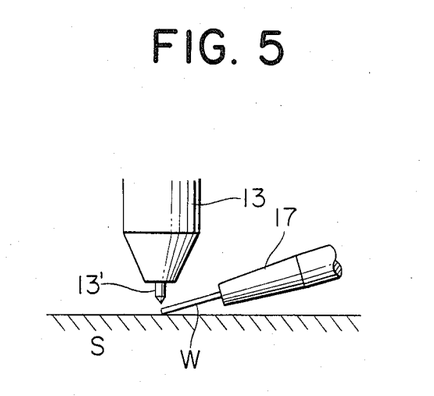
FIG. 5 is an explanatory representation to indicate the relative positions between the electrode of the welding torch and the build-up welding wire prior to the commencement of the welding operation.

In this manner, upon completion of the first layer of the build-up welding of valve seat S, and after the position of welding torch 13 is adjusted by a procedure similar to the above, the build-up welding procedure is repeated succeedingly for the 2nd, 3rd and so on layers until a desired number of layers is attained.

Further, in this case, when the rotation of main shaft 11, the movement of welding torch 13, the supply of build-up welding wire W, etc. are controlled through the various control means contained in the central board according to the program previously stored, an appropriate build-up welding operation can be automatically carried out. The relative position between welding torch 13 and valve seat S can be confirmed by projecting it on the television receiver in the control board through image sensor 12.

Upon completion of the build-up welding in the desired layers, the apparatus according to the present invention is removed from the valve box, the heat treatment apparatus described above being mounted to the valve box to carry out the heat treatment of the build-up welded portion, and next it is replaced by the automatic machining apparatus also described above for finishing the build-up welded portion, and finally the automatic machining apparatus being replaced by the automatic penetrant testing apparatus to check whether or not there exists any defect in the build-up welded portions.

Although one embodiment of the present invention has been described above which comprises four removable parts, the present invention may be embodied as comprising two or three parts with the independent mechanisms being suitably combined together, and in extreme cases it may be embodied as an integral unit if the spot to apply the present apparatus allows the use of such an integrally assembled unit.

Figure 6:
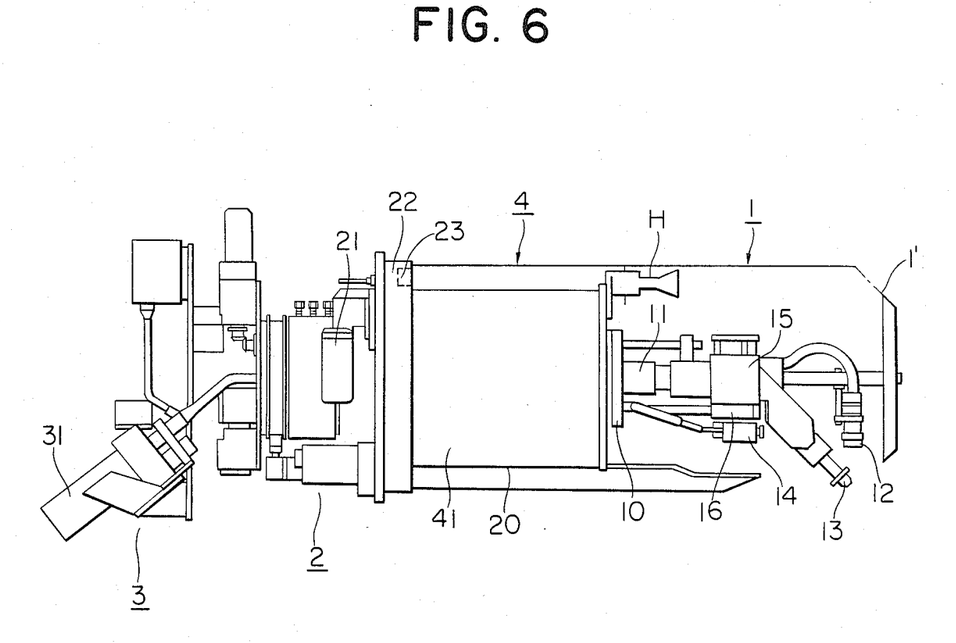
FIG. 6 is a front elevational view of another embodiment of the present invention.

FIG. 6 indicates another embodiment of the present invention wherein it is embodied as an integral assembly. In the drawing the similar or corresponding elements to those in the previous embodiment bear the same reference numerals as those given to the latter. It is believed that the constitution and operation of this embodiment is self-explanatory for those skilled in the art.

It will be noticed that so far as the order of the various mechanisms 1, 2, 3 and 4 is concerned there is a slight difference between the two embodiments, but, whatever embodiment may be taken, it is only essential that welding unit mechanism 1 be constructed so that it is always adapted to be positioned within the valve box when the apparatus is to be operated.

Figure 7:
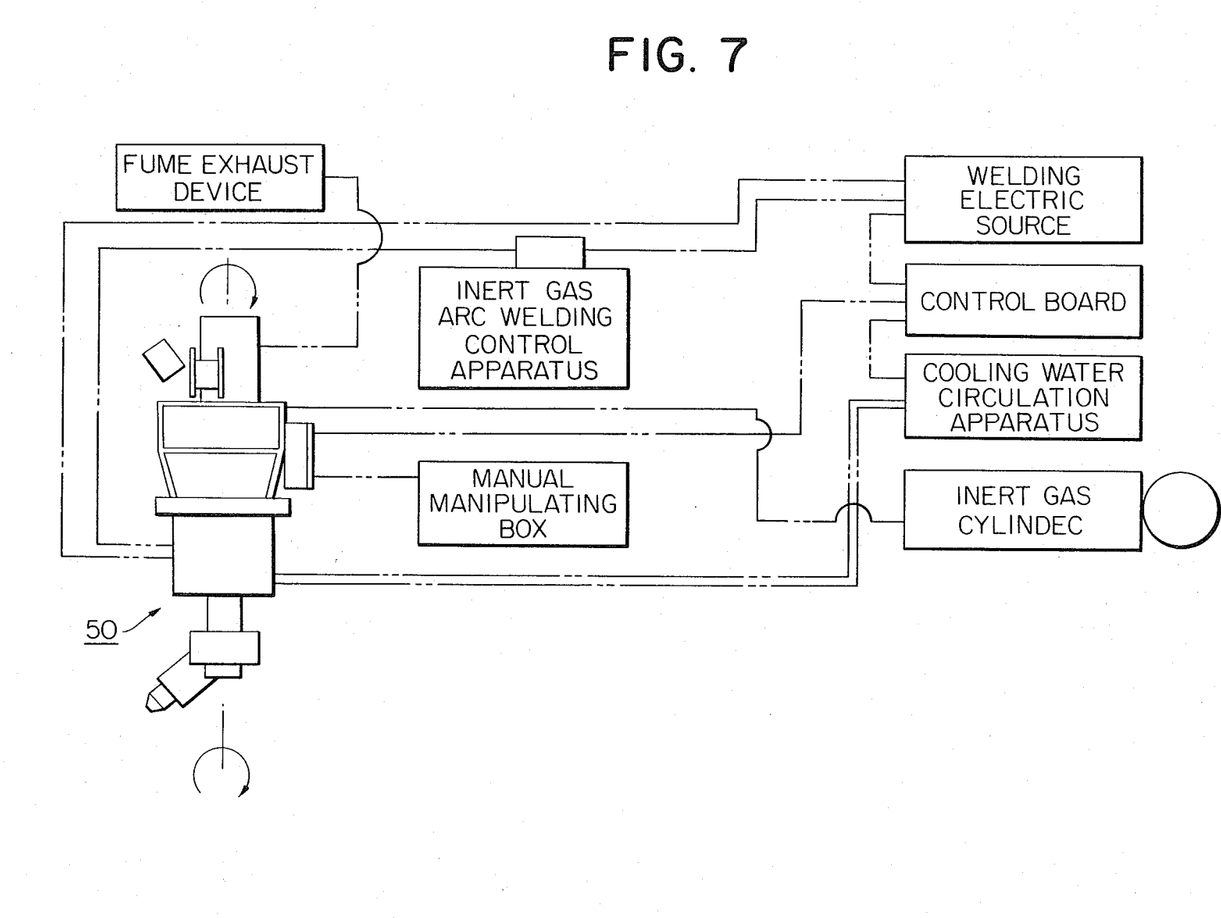
FIG. 7 is a representation to show the relationship between the apparatus according to the present invention and the auxiliary equipment necessary for the operation thereof.

Finally, FIG. 7 indicates the relative connection between the build-up welding apparatus proper 50, in accordance with the present invention, and the various control devices as well as the auxiliary apparatuses in a somewhat block diagram fashion.

Additonally image sensor 12 may be a bore scope, fiber scope, or the like.

From the foregoing it will be appreciated that the most important feature of the apparatus in accordance with the present invention is that it allows on the spot build-up welding of the valve seat of a Y-type main steam isolation globe valve used in an atomic power station with the welding torch being introduced into the valve box and the welding operation being viewed by the image sensor positioned near the welding torch, and all of the operation being remotely controlled away from the spot so that the operator is perfectly isolated from exposure to a radioactive environment.

Thus, it will be also be appreciated that the detailed constitution of the apparatus will be a choice in design easily accessible for those skilled in the art from the embodiments described and illustrated above and from their knowledge.

Although a few embodiments of the present invention have been described and illustrated, it will be understood by those skilled in the art that modifications may be made in the structure, form and relative arrangement of parts without necessarily departing from the spirit and scope of the present invention.

What is claimed is:

1. An automatic valve seat build-up welding apparatus for a Y-type main steam isolation globe valve used in an atomic power station which allows, at the time of the repair of said valve seat, the build-up welding operation with said valve remaining mounted to the piping in said plant, comprising substantially four mechanisms arranged on an axis including a welding unit mechanism, a main drive mechanism, an observation mechanism and a slip ring mechanism;

(i) said welding unit mechanism being adapted to be introduced into the valve box of said valve, and being provided with a rotatable main shaft extending in the longitudinal direction thereof, said main shaft fixedly mounting at its forward end an image sensor and providing thereon a welding torch having centrally thereof an electrode and means for shielding said electrode by an inert gas such that said electrode is movable both in the direction of said axial line of said main shaft and in the direction orthogonal thereto under the condition that the axis of said electrode intersects said axial line of said main shaft at some angle, said welding torch having a build-up welding wire supply tip disposed such that said axis of said welding torch intersects said supply tip at some angle away from the forward end of said welding torch;

(ii) said main drive mechanism being adapted to be interconnected with said welding unit mechanism and including a number of motors to drive said main shaft and welding torch of said welding unit through motion transmitting means;

(iii) said observation mechanism being adapted to be connected to said main drive mechanism on the opposite side from said welding unit mechanism and having a television camera connected to said image sensor of said welding unit mechanism, said television camera transmitting image signals to a television receiver mounted on an outside control board through said slip ring mechanism, whereby said control board is operable to control various components of said apparatus;

(iv) said slip ring mechanism being adapted to be connected to said observation mechanism or said welding unit mechanism and provided with means to supply electrical current to said motors contained in said main drive mechanism as well as means as to deliver an inert gas to said welding torch of said welding unit mechanism, said slip ring mechanism further provided with cooling water delivery means to cool said welding torch and said image sensor of said welding unit mechanism.

2. An automatic valve seat build-up welding apparatus as claimed in claim 1, said main drive mechanism is provided with a flange around its housing in which are embedded in the side confronting said valve box, one or more electromagnets, said electromagnets being operable to secure said housing and therefore the whole of said apparatus to said valve box when they are energized.

3. An automatic valve seat build-up welding apparatus as claimed in claim 1 wherein shiftably mounted on said main shaft of said welding unit mechanism is a guide frame, so as to align the axial direction of said main shaft, a support frame being mounted on said guide frame orthogonally to said axial direction of said main shaft, and mounted on said support frame are said welding torch and said build-up welding wire supply tip, said guide and support frame being separately drivable by said motors contained in said main drive mechanism.

4. An automatic valve seat build-up welding apparatus as claimed in claim 3 wherein said support frame also mounts a magnetic field generating means near the forward end of said welding torch so as to oscillate relative to said welding torch in order to cause the generated arc to be woven, said magnetic field generating means being adapted to be driven in an oscillatory fashion by said motor contained in said main drive mechanism through a suitable motion transmitting means.

5. An automatic valve seat build-up welding apparatus as claimed in claim 1 wherein a fume exhaust device is opened in said weld unit mechanism so that fumes generated in said welding unit mechanism can be exhausted to the outside of said apparatus through said fume exhaust device.

6. An automatic valve seat build-up welding apparatus as claimed in claim 1 wherein said apparatus is additionally provided with an electric current source to feed electrical current to said welding torch of said welding unit mechanism and a control board to effect the remote starting, stopping and adjusting of the various components of said apparatus, said control board also mounting a television receiver to observe the image sent from said television camera provided in said observation mechanism, said television camera receiving the image from said image sensor in said welding unit mechanism.

7. An automatic valve seat build-up welding apparatus as claimed in claim 1 wherein said image sensor is a bore scope, fiber scope or the like.

8. An automatic valve seat build-up welding apparatus as claimed in claim 1 wherein said main drive mechanism is releasably connected to said welding unit mechanism and wherein said observation mechanism is releasably connected to said main drive mechanism.

9. The apparatus of claim 8 wherein the slip ring mechanism is releasably connected to said observation mechanism.

10. An automatic valve seat build-up welding apparatus as claimed in claim 1 wherein said slip ring mechanism is releasably connected to said welding unit mechanism, wherein said main drive mechanism is releasably connected to said slip ring mechanism and wherein said observation mechanism is releasably connected to said main drive mechanism.

* * * * *